(No Model.)

J. S. ROBBINS.
POTATO PLANTER AND FERTILIZER DISTRIBUTER.

No. 475,519. Patented May 24, 1892.

Witnesses:

Inventor,
Josiah S. Robbins
By Henry D. Phillips
Atty.

UNITED STATES PATENT OFFICE.

JOSIAH S. ROBBINS, OF ALLENTOWN, NEW JERSEY.

POTATO-PLANTER AND FERTILIZER-DISTRIBUTER.

SPECIFICATION forming part of Letters Patent No. 475,519, dated May 24, 1892.

Application filed February 10, 1892. Serial No. 420,976. (No model.)

*To all whom it may concern:*

Be it known that I, JOSIAH S. ROBBINS, a citizen of the United States, residing at Allentown, in the county of Monmouth and State of New Jersey, have invented certain new and useful Improvements in Potato-Planters and Fertilizer-Distributers; and I do hereby declare the following to be a full, clear, and exact description of the invention, such as will enable others skilled in the art to which it appertains to make and use the same.

This invention relates to an improvement in planters and fertilizer-distributers; and it consists in the construction and arrangement of parts more fully hereinafter described, and definitely pointed out in the claims.

The object of my invention is the production of a potato-planter which is effective in its operation, simple in construction, and one in which the dropping apparatus is in full view of the operator. This object I accomplish by the construction and arrangement of parts, more fully hereinafter described, and fully illustrated in the accompanying drawings, wherein like letters of reference indicate like parts in the several views, and in which—

Figure 1:
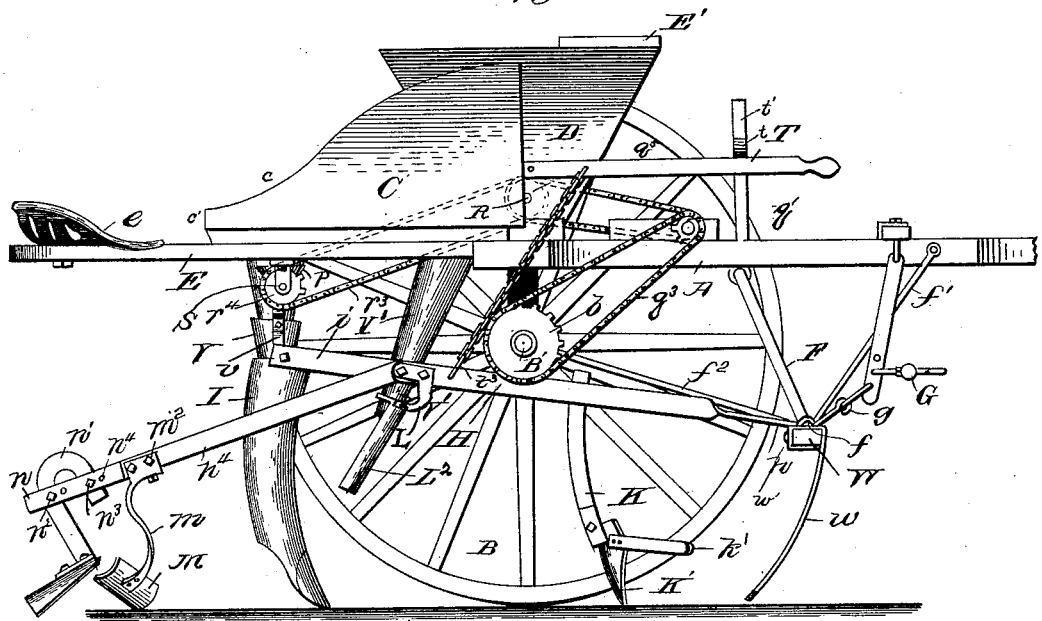
Figure 2:
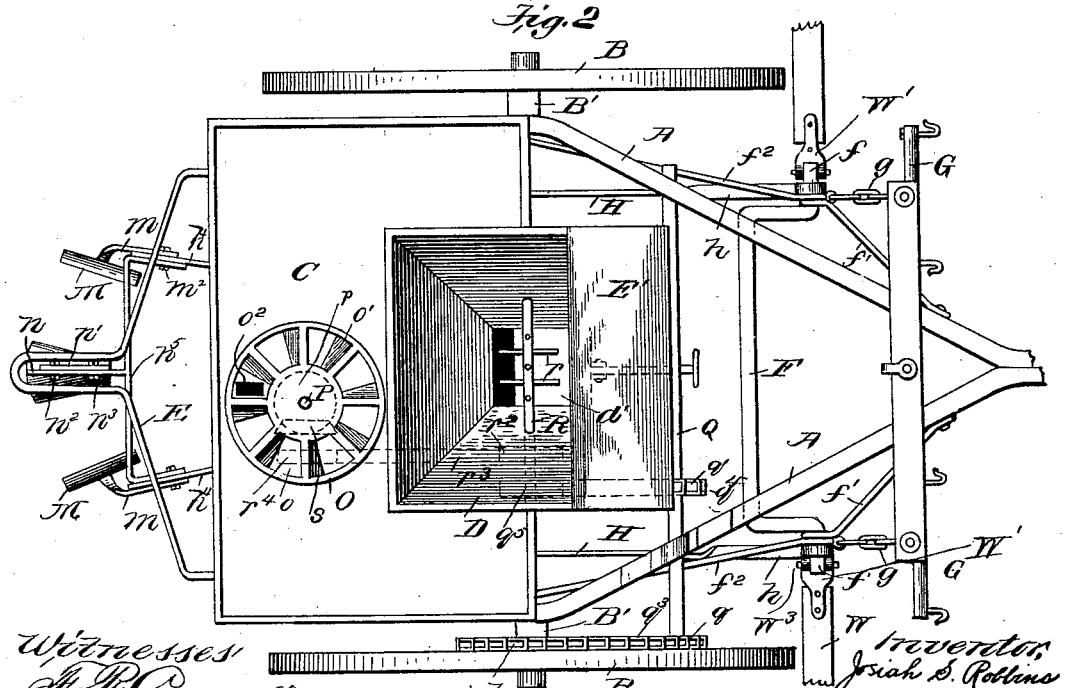

Figure 1 is a side elevation of my improved apparatus with the near wheel removed. Fig. 2 is a top plan view with the seat and lever removed.

In the drawings, A represents the frame of the machine, supported by wheels B on axle B', the inner end of the hub of one of the wheels carrying the sprocket drive-wheel $b$.

C is a potato or seed hopper supported on the rear of the frame A, having the downwardly-curved sides $c$ and low rear end $c'$. In front of the potato-hopper and projecting partly into the same is a fertilizer-hopper D, having the sliding cut-off $d'$ for graduating the flow of the fertilizer.

Extending out from the sides of the rear of the frame A and beyond the potato-hopper is a looped frame E, upon which is adjustably secured the operator's seat $e$.

E' is the driver's seat, supported on the upper edges of the front of the fertilizer-hopper.

Secured to the under side of the forward end of the frame A and opening downward is a U-shaped frame F, provided at its ends with the lateral outwardly-extending arms $f$ and having braces $f'\ f'$ and $f^2\ f^2$, sleeved at one end on the arms $f$ and secured at their other ends to the frame and axle, respectively.

G is a suitable draft attachment connected to the arms $f$ by hooks $g$, thereby bringing the power more direct to the desired point.

Beneath the potato-hopper and fertilizer-hopper is the cultivator-frame consisting of the bars $h$, sleeved at their forward ends to the arms $f$ of the U-shaped frame F, and being secured at their rear ends on opposite sides of the forwardly-extending arm $i$ of the drill-tube I. The rearwardly-extending downwardly-inclined arms $h^4\ h^4$, connected at their forward ends to the sides of the rear ends of the arms $h\ h$ and spreading at their rear ends and connected by the brace $h^5$, constitute the supporting-frame for the coverers.

Adjustably secured to the frame H of the cultivator-frame and extending downward is a standard K, carrying at its lower end the wide cultivator-tooth K', provided with arms $k'$, adapted to break the clods thrown up from the seed-row made by the cultivator-tooth. On the outer faces of the side bars of the frame, just in front of the arms $h^4$, are secured the downwardly-extending short supports L, supporting a cross-bar, to which is secured the fan-shaped spreader $L^2$.

M M represent concave covering-hoes, inclined downwardly and outwardly, secured on arms $m\ m$, adjustably secured on the rear ends of arms $h^4\ h^4$ by bolts $m^2$, passing through the arms $m$.

Extending out rearwardly from the brace $h^5$ is a support $n$, at the outer end of which is the curved arm $n'$, on which the downwardly-inclined concave smoothing-shovel is adjustably secured by bolts $n^2\ n^3$, passing through the support $n$ and the arm $n'$.

O is the dropping-wheel, formed with radially-arranged pockets $o$, each pocket being provided with a curved cut-away portion $o'$, which assists in the carrying of the seed to the dropping-opening $o^2$ in the bottom of the hopper, over which the pockets pass without mutilating or crushing the same. The wheel is driven by a vertical shaft P, journaled in the bottom of the hopper, carrying at its lower end a bevel-pinion $p$, its upper end being squared to engage in a squared socket in the wheel.

Journaled on the front of the frame A, carrying a sprocket-pinion $q$ at its outer end and sprocket-wheel $q'$ on its intermediate ends, is a shaft Q. The sprocket-pinion $q$ is connected with the sprocket drive-wheel $b$ of the wheel-hub by a sprocket-chain $q^3$, the sprocket-wheel $q'$ being also connected by a sprocket-chain $q^4$ with a sprocket-wheel $q^5$ on the shaft R, carrying at its inner end a fertilizer-stirrer $r$, situated in the bottom of the hopper D and carrying a second sprocket-wheel $r^2$, connected by a sprocket-chain $r^3$ with the sprocket-wheel $r^4$ on the outer end of the shaft S, which is journaled in bearings on the bottom of the hopper and carries at its inner end bevel-pinion $s$, engaging with a bevel-pinion $p$ on the shaft P.

Journaled in the rear of the shaft Q is the operating-lever T, adapted to engage under a tooth or teeth $t$ on spring-catch $t'$ when the lever is pushed down. The lever T is connected at its outer end by a chain $t^3$ with the cultivator-frame, all so arranged that when the lever is raised the frame is raised, the lever being held in its position by the spring-catch $t'$.

W are marker-bars carrying markers $w$, adjustably secured thereto by a bolt $w'$, passing through openings in the bars. The inner ends of the bars carry forked plates W', extending out beyond the bar and hinged to the ends of arms $f$ by pins $w^3$, passing through horizontal openings in the forked ends of the plates W', the forks extending on either side of the arms $f$ and through horizontal openings in the ends of the arms $f$.

V is a series of telescoping seed-conveyer pipes discharging at their lower end into the drill-tube I and receiving the seed from the dropping-wheel through the opening $o^2$ in the bottom of the potato-hopper. These tubes V are connected by a flexible strap $v$, which allows the pipes to slide over each other when the lower frame is raised and prevents the pipes from becoming disconnected as the same is lowered. V' is a tube carrying the fertilizer from the hopper and discharging it onto the upper end of the spreader $L^2$.

In operation, the cultivator-frame having been lowered, the furrow for the seed is made by the broad cultivator-tooth K', carrying the arms $k$, which break the clods at the edges of the furrow and making an even surface for the row, which is sprinkled with fertilizer by the spreader $L^2$. The potatoes from the potato-hopper are dropped into the respective pockets of the wheel by the operator, and as the pockets come over the opening $o^2$ the seed is discharged and drops down through the drill-tube into the furrow, prepared as before described. The seed is covered by the covering-hoes and the row is smoothed off by the smoothing-shovel in the rear, thus planting the potatoes at an even depth and giving an even appearance to the field.

I am aware that many minor changes in the construction and arrangement of the parts of my apparatus can be made and substituted for those herein shown and described without in the least departing from the nature and principle of my invention.

Having thus described my invention, what I claim as new, and desire to secure by Letters Patent, is—

1. In a planter, the combination, with the frame and seed-hopper having a discharge-opening in its bottom, of a dropping-wheel having a series of radially-arranged pockets therein, adapted to pass over the discharge-opening in the bottom of the hopper, a downwardly-extending U-shaped frame secured to the front of the frame, a cultivator-frame hinged to the lower ends of the U-shaped frame and extending rearwardly, a wide cultivator-tooth secured to the forward end of the cultivator-frame, a drill-tube secured to the cultivator-frame in the rear of the cultivator-tooth, a pipe below the discharge-opening in the hopper, having its lower end discharging into the drill-tube, coverers on the frame in the rear of the drill-tube, and a row-smoother adjustably secured to the cultivator-frame of the coverers, substantially as described.

2. In a planter, the combination, with the frame, a seed-hopper having a discharge-opening in its bottom, and a fertilizer-hopper having a discharge-pipe connected with its lower end, of means for dropping the seed through the discharge-opening in the hopper, a downwardly-extending U-shaped frame secured to the front end of the frame, a cultivator-frame hinged to the lower ends of the U-shaped frame and extending rearwardly, a wide cultivator-tooth secured to the cultivator-frame at its forward end, a fan-shaped fertilizer-spreader secured to the cultivator-frame in the rear of the tooth, a drill-tube secured to the cultivator-frame in the rear of the fertilizer-spreader, a pipe below the discharge-opening in the hopper, having its lower end discharging into the drill-tube, coverers on the cultivator-frame in the rear of the drill-tube, and a row-smoother on the cultivator-frame in the rear of the coverers, substantially as described.

In testimony whereof I affix my signature in presence of two witnesses.

JOSIAH S. ROBBINS.

Witnesses:
E. E. HUTCHINSON,
GEO. H. VANDERBEEK.